P. FURTNER.
COUPLING FOR FLUID PRESSURE CONDUITS.
APPLICATION FILED MAY 7, 1908.
901,289.
Patented Oct. 13, 1908.
4 SHEETS—SHEET 1.
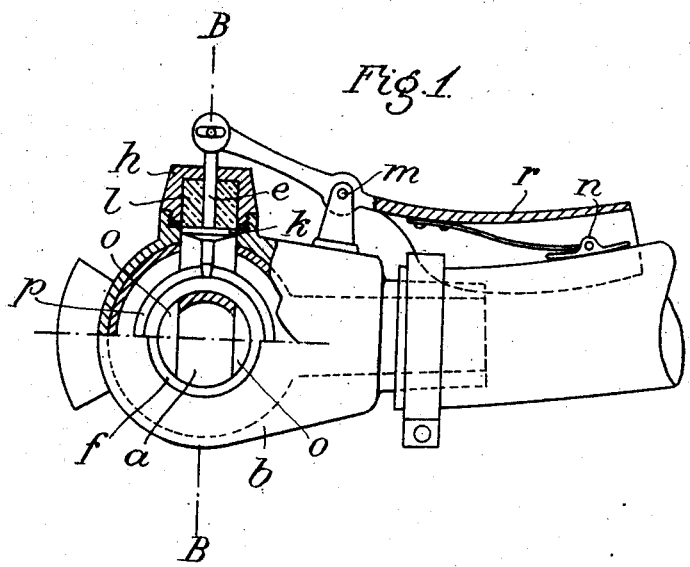
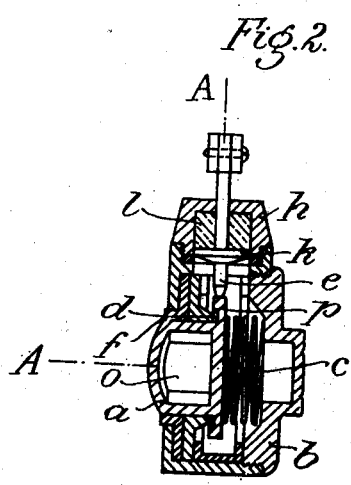

P. FURTNER.
COUPLING FOR FLUID PRESSURE CONDUITS.
APPLICATION FILED MAY 7, 1908.
901,289.
Patented Oct. 13, 1908.
4 SHEETS—SHEET 2.
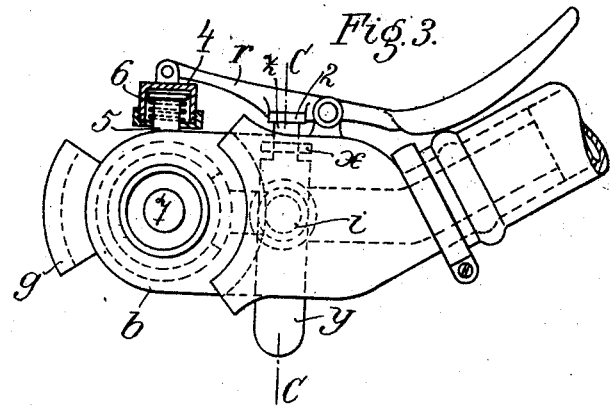
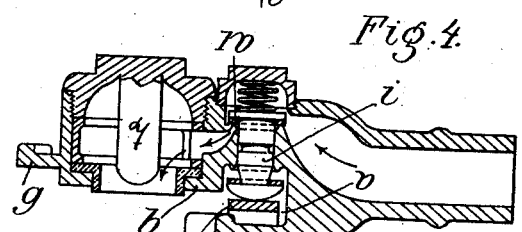
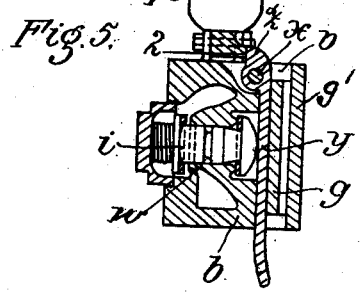 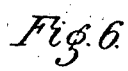
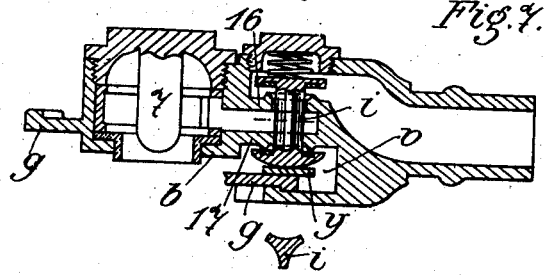

P. FURTNER.
COUPLING FOR FLUID PRESSURE CONDUITS.
APPLICATION FILED MAY 7, 1908.
901,289.
Patented Oct. 13, 1908.
4 SHEETS—SHEET 3.
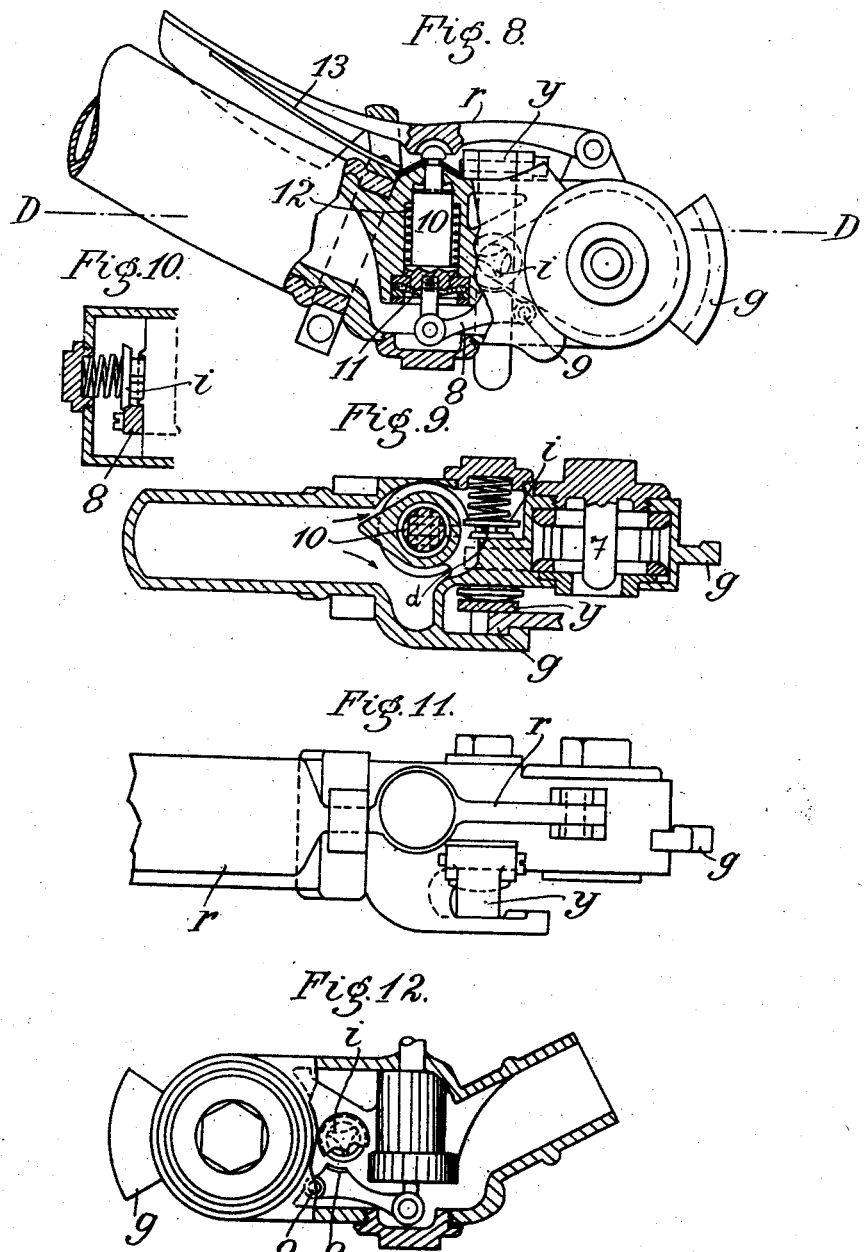

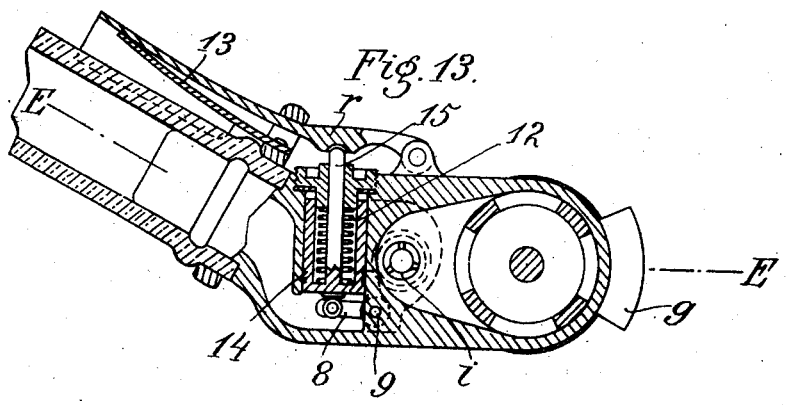
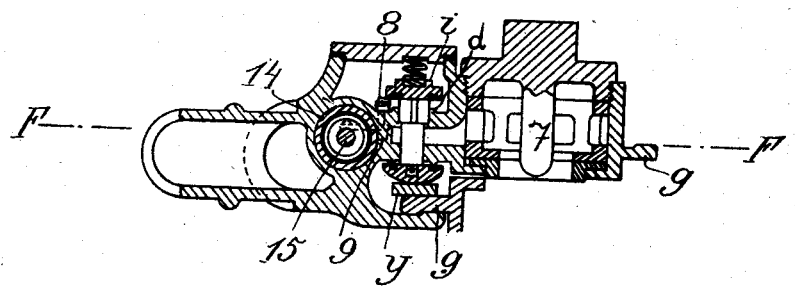

UNITED STATES PATENT OFFICE.

PETER FURTNER, OF ROSENHEIM, GERMANY.

COUPLING FOR FLUID-PRESSURE CONDUITS.

No. 901,289.  Specification of Letters Patent.  Patented Oct. 13, 1908.

Application filed May 7, 1908. Serial No. 431,465.

*To all whom it may concern:*

Be it known that I, PETER FURTNER, citizen of Germany, residing at Rosenheim, Bavaria, Germany, have invented certain new and useful Improvements in Couplings for Fluid-Pressure Conduits; and I do hereby declare the following to be a full, clear, and exact description of the invention, such as will enable others skilled in the art to which it appertains to make and use the same.

The present invention relates to an improvement in couplings for connecting up the fluid pressure conduits such as air-conduits of atmospheric brakes as used on railways, said couplings having valves or similar closure means either at the point of connection of the coupling itself or in the vicinity of this point, and the improvement consists essentially in the provision of a hand-lever for actuating said valves, so situated on the air-tube of the brake that the hand grasping this tube for the purpose of connecting or disconnecting the coupling must of necessity operate said lever.

In the following specification several forms of construction of such couplings are described in detail, the auxiliary devices necessary for insuring the proper action of the valves in each case being also fully treated of. These forms of construction may be divided into two distinct groups, namely couplings having the valves or other means of closure at the point of coupling itself and couplings having the valves at a short distance from the point of connection.

Reference being had to the accompanying drawings, Figures 1 and 2 illustrate a form of construction of the first group above mentioned, Fig. 1 being a side elevation partially in section along the line A—A in Fig. 2, and Fig. 2 being a vertical section on line B—B of Fig. 1. Fig. 3 represents a side elevation of a modified form of coupling device; Fig. 4 a horizontal longitudinal section thereof; Fig. 5 a vertical section of the same on line C—C, Fig. 3; and Fig. 6 a detail view; Fig. 7 shows a horizontal section of a slightly modified form of the construction in Figs. 3 to 6; Fig. 8 represents a side elevation partly in section of another modified form of coupling under my invention; Fig. 9 a horizontal longitudinal section thereof; Fig. 10 a detail view showing the engagement of the catch and valve; Fig. 11 a plan view showing the arrangement of the hand lever; and Fig. 12 a rear view partly in section to show the internal construction; Fig. 13 represents a vertical longitudinal section of still another form of coupling; and Fig. 14 a horizontal section on the line E—E of Fig. 13.

Similar parts are similarly designated throughout the various views.

In the form of construction shown in Figs. 1 and 2, the valves situated in each half of the coupling force each other into the open position when coupled, thereby establishing the pneumatic connection between the different parts of the train.

In order to prevent the valves again closing when the two halves of the coupling become accidentally separated, for instance, when a part of the train becomes detached, a separate safety device is provided. This consists of a spring-pressed pin, influenced by or connected with the lever which is operated by the hand manipulating the coupling. This pin and hand-lever are so arranged that when the uncoupling is done by hand the safety device is put out of operation, and the end of the air channel will then be automatically closed by the valve situated in the corresponding half of the coupling. This is a point of especial importance, since in this way both ends of the air-conduit of a detached car must necessarily be always closed and obviously therefore the rear end of the air-conduit of a complete train will always be closed. A separate manipulation for this purpose on the part of the attendant effecting the connections is therefore wholly unnecessary.

In Figs. 1 and 2, (*a*) is the valve, having a rounded projecting end, slidably arranged in the casing (*b*), and lightly pressed by the spring (*c*) against the valve-seat or port (*d*) of the casing. Since the rounded end of each valve projects beyond the bushing (*f*) of each half of the coupling, these valves will mutually push one another back when the coupling is connected, thereby opening the atmospheric connection through the passages (*o*) of the valves.

The already mentioned safety device for keeping the valves open in case of an accidental disconnection of the coupling consists essentially of a pin (*e*) slidably arranged in the hood (*h*) mounted on the coupling member (*b*). This pin is provided with a disk (*k*) abutting against an elastic plug (*l*) of rubber or the like, said plug (*l*) at the same time serving as an air-tight packing. A lever (r), pivoted at (m), and spring-pressed, always tends to push the pin (e) into the interior of the casing (b) of the coupling. The spring of the lever (r) may advantageously be provided with a sliding foot (n). When now the valve is closed, the flange (p) of the valve prevents the forward motion of the pin (e) and said pin rests on this flange, as shown in Fig. 2. But as soon as the valve together with its flange is pressed back in the act of coupling, the pin (e) will be pressed down in front of the flange and will therefore prevent the closing of the valve until such time as a pressure on the lever (r) again raises the pin (e). When now the coupling is disconnected by hand, lever (r) raises the pin (e), and the valve becomes again free to close the air-channel under the influence of its spring (c). The lever (r) is given such a position that it must of necessity be pressed down by the hand manipulating the coupling. The handle of the lever (r) will advantageously receive a curved shape conforming to the exterior of the air-tube, so that it can be conveniently grasped by the hand together with said tube.

In the forms of construction illustrated in Figs. 3 to 14 the means of closure are not situated at the point of contact of the coupling heads or members, and the valves can therefore not mutually influence each other as in the above-described type. A separate device is therefore necessary to insure the opening of the valves when the coupling heads are connected. To this end, upon each coupling head, claws or other suitably formed projections are provided, adapted to actuate or raise the valve of the other half. These valves may be arranged with their axes either parallel to the longitudinal axis of the air-channel or at right angles to the same. In the first case the valves are pushed open by the front surfaces of the claws or other projections when the coupling is connected, while in the latter case the lateral surfaces of the claws influence the valves either directly, or indirectly through the medium of a push-plate or the like. The latter arrangement has the advantage that each claw is guided by the cheek of the opposite coupling head or member, and is thus forced into the correct position for opening the valve of the latter. A further advantage of this arrangement is that the valve can be so constructed that it itself closes the bore-hole or socket for the valve-stem when the valve has opened the air-passage of the coupling.

An example of the coupling as last described is illustrated by Figs. 3, 4, 5 and 6. In this form of construction the valve (i) is arranged behind the point of coupling at right angles to the air-channel in such a manner that one end lies within the air-channel and the other end projects into the recess (v) formed by an arm or claw g' extending under said valve and parallel to the body of the coupling head for the claw (g) of the opposite half of the coupling (Fig. 4). The valve (i) is double-acting, and the portion of the coupling serving as a sleeve for the valve-stem is adapted to act on both sides as a valve-seat, so that the bore-hole or socket forming a sleeve for the valve-stem is closed air-tight in either position of the valve. The valve-seat on the side of the air-channel is provided with an annular recess, from which a semi-circular slit (w) leads into the air-chamber of the coupling member (Fig. 6). The valve (i), which may advantageously be spring-pressed, is, on connecting the coupling, pushed into the open position by the claw (g) of the opposite coupling member as shown in Figs. 5 and 7, either directly, or indirectly with the help of the push-plate (y) hinged at (x), as may be seen in Fig. 5. This push-plate (y) should be chosen of such a length that it projects beyond the recess (v), so that, if desired, the closed valve may be opened without necessarily uniting the two halves of the coupling, thereby making it possible to operate the air-brake of each single detached car. The push-plate (y) facilitates the opening of the valve as compared with the direct opening by means of the claw and the form of construction here under consideration has therefore been provided with such a push-plate. But this push-plate (y) has the further advantage of making it possible to insure the open position of the valve, in case an accidental disconnection of the coupling should take place. In this case, in order to prevent the valve (i) from pushing back the push-plate (y) when the claw (g) is removed, said push-plate is provided with a beak (z), adapted to rest against a stop (2) of the lever (r) when the valve is open. This lever (r), the handle of which is curved to conform to the exterior of the air-tube, and is so situated that it must of necessity be pressed down by the hand manipulating the coupling, will therefore release the push-plate (y) as soon as the coupling is disconnected by hand, thereby allowing the valve (i) to close the air outlet, which it will do as soon as the claw (g) is removed from the recess (v). On the other hand, in case of an accidental disconnection of the coupling, the beak (z) abutting against the stop (2) of the lever (r), which latter is now not pressed down, will prevent the closing of the valve, and the operation of the brake is thereby insured. As may be seen in Fig. 3, the elongated end of the lever (r) is provided with a pivoted cap (4), containing a coil-spring (6), pressing against the head of the pin (5), which latter is mounted on the case (b) of the coupling member; this spring tends to always return the lever (r) to the position necessary for locking the push-plate (y). Instead of the arrangement of a coil spring, as here shown, a spring suitably arranged at the handle end of the lever would obviously serve the same purpose.

In order to be able to connect a coupling member of the type last described with a coupling member having the valve at the point of junction itself, as described in the first part of this specification, the former is provided with a central pin or projection (7) which, as shown in Figs. 3 and 4 extends from the interior of the casing substantially to the plane of the port, d, by which the communication with the interior of the coupling head is established. This pin, 7, will push back the valve of the other coupling member, thus opening the air-channel. Without the provision of this pin (7) it would not be possible to make an atmospheric connection between the portion of the train situated behind such a coupling with two dissimilar halves and the front part of the train.

Fig. 7 shows a further example of a coupling member of the same character as the last described. The valve (i) is here modified in order to simplify the merging of the air-channel into the interior chamber of the coupling member. For this purpose the hollow interior chamber of the case (b) is extended to below the air-channel, so that two partitions (16 and 17), each provided with a valve-seat, are formed; both partitions have a common bore-hole for the star-shaped stem of the double-valve (i). This valve-stem is shown in section below Fig. 7. When the valve is now raised the air can pass between the valve stem and the interior walls of the bore-hole from the air-channel into the interior chamber of the coupling. Obviously the valve stem may receive any other suitable sectional form, for instance, it may be made rectangular. In all other respects the coupling member according to Fig. 7 is similar to the coupling illustrated in Figs. 3, 4 and 5, and already described in detail.

Finally, Figs. 8 to 14 illustrate two further forms of construction of couplings with valves arranged at right angles to the longitudinal axis of the air-channel, both differing from the last described type in that the open position of the valve in case of accidental disengagement of the coupling is not insured through the medium of the hand-lever holding a flap in position under the valve-end, but by a device operated by the pressure of the air in the air-chamber or conduit. This arrangement has the essential advantage that in case of an accidental disconnection of the train only so much compressed air will escape as is absolutely necessary to put the brake in operation, and the following raising of the atmospheric pressure in the brake conduit to the necessary point will therefore take only a short time; the delay caused by such an accidental disconnection is hereby greatly shortened. According to this new arrangement the stop or catch or the like for insuring the open position of the valve is in connection with pressure actuated means, such as a piston or membrane, which latter is influenced by a spring on the one hand and by the air-pressure in the brake conduit on the other hand, the spring tending to oppose the pressure actuated means and thereby release the catch when the pressure in the pipe has descended to a predetermined point. It is obvious that this safety catch may also be adapted to be operated by the hand-lever in order to insure the immediate closing of the conduit ends when disengaging the coupling by hand, as in the already described forms of construction. In the accompanying drawings, Figs. 8 to 12 show a coupling member of this type fitted with a diaphragm or membrane. Figs. 13 and 14 illustrate a coupling member in which a piston operates the safety catch. In the first of these two forms of construction (Figs. 8 to 12), (i) represents the valve, arranged at right angles to the longitudinal axis of the air-channel, (8) represents the safety catch, pivoted at (9), and connected with the flexible diaphragm (11) through the hinged bolt (10). This bolt (10) is acted on by a coiled spring (12) or the like in such a manner that it always has the tendency to disengage the catch (8) and the valve. The bolt (10) protrudes to the outside of the coupling and is adapted to be pressed down by the hand lever (r), which latter is normally held back by the spring (13), as shown in Fig. 8. The manner of operation of this device is as follows: If two halves of a coupling are connected, the valve (i) of each half will be opened by the claw (g) of the other half, through the medium of the push-plate (y) as indicated in Fig. 9. The air pressure in the channel will then act on the diaphragm (11) and through this on the bolt (10) and catch (8), causing the latter to engage with the valve-head and to insure the open position of the valve. It is obvious that the valve will then be kept open as long as the air-pressure is greater than the opposing pressure of the spring (12). If now an accidental disconnection takes place, air will escape, the brakes will come into operation, and as soon as the pressure of the air has become weaker than the pressure of the spring (12), the catch (8) will be automatically pushed back and the valve, which may advantageously be spring-pressed, will close, thus preventing the complete emptying of the air-channels. When the couplings are connected or disconnected by hand, the lever (r) will necessarily cause the catch (8) to temporarily disengage, leaving the valve free to open or close, as the case may be. In the other form of construction of this type (Figs. 13 and 14), instead of a diaphragm a piston

(14) is provided, also actuated by a spring (12), said piston being connected with the safety catch (8), pivoted at (9). The piston (14) is provided with a rod (15) protruding beyond the casing, so that the hand-lever (r) can also operate the catch (8). The manner of operation of this device is the same as in the last described form of construction (Figs. 8 to 12), which has already been described in detail.

In the forms shown in Figs. 8 to 14 it will be noted that the central pin, 7, extending substantially to the plane of the inlet port, d, is again employed, for the purpose already set forth.

From the above it will be noted that under my invention the coupling head is provided with a closure valve and means for yieldingly holding the same in its closed position, such valve being combined with a stop such as the pin e, in Fig. 1 or the push-plate y having a beak z combined with the lug, 2, in Figs. 3 to 6 or the catch 8 in Figs. 8 to 13, and with means for releasing or disengaging such stop. These disengaging means, as shown herein, consist of the spring pressed lever r, and in the case of the modification of Figs. 8 to 13, an automatic disengaging or tripping device is provided by the diaphragm 11, or piston 14, acting against the stress of the calibrated spring 12, so that, as explained above, when the fluid pressure in the conduit reaches a certain point, the valve will be opened. In all cases it will be noted that the releasing or disengaging lever, r, is so arranged on the coupling head, that its free and normally yieldingly pressed arm will be at a point where the coupling head will be grasped when manipulating the same, such for example as uniting the same with the coupling head of another section.

In the case where the valve stem extends outside the coupling head casing the locking means for the closure in its open position may, as has been shown, be arranged with or without said casing.

What I claim as my invention and desire to secure by Letters Patent, is:

1. The combination, with a coupling head for fluid pressure conduits, of a valve stop and a releasing lever therefor pivoted on the coupling head and having its free end yieldingly pressed away from said coupling head and extending to a point where the said coupling head will be grasped when manipulating the same.

2. In a coupling-head for fluid pressure conduits, a valve-seat arranged across the fluid channel thereof, a coupling claw as $g'$ extending alongside the coupling head casing and opposite the valve-seat, and a spring pressed valve adapted to bear upon said valve-seat and provided with a stem extending outside the coupling head casing, in combination with a push-plate mounted on the side of the casing between the valve and the coupling claw and adapted to be pressed against the projecting end of the valve-stem.

3. In a coupling head for fluid pressure conduits, a valve seat arranged across the fluid channel thereof, a coupling claw, as $g'$, extending outside the coupling head casing and opposite the valve-seat, and a spring-pressed valve adapted to bear upon said valve seat and provided with a stem extending outside the coupling head casing, in combination with a push-plate mounted on the outside of the casing between the valve and the coupling claw adapted to be pressed against the projecting end of the valve stem, the axes of the valve-seat and of the valve stem being transverse to the axis of the fluid channel.

4. In a coupling head for fluid pressure conduits, a valve seat arranged across the fluid channel thereof and having its axis transverse to the axis of the fluid channel, a coupling claw, as $g'$, extending outside the coupling head casing and opposite the valve seat, and a spring-pressed valve adapted to rest upon said valve seat and provided with a stem transverse to the axis of the fluid conduit and extending outside the coupling head casing, in combination with a push-plate mounted on the outside of the casing between the valve and the coupling claw, and adapted to be pressed against the projecting end of the valve stem, means for locking said valve when it has been opened by the push-plate, and means for tripping the locking means.

5. In a coupling head for fluid pressure conduits, a closure valve, means for yieldingly closing the same, and a movable stop for holding said closure valve open, in combination with pressure actuated means arranged transversely of the fluid channel for holding said stop in engagement with the valve, and means for acting in opposition to said pressure actuated means and to trip the stop.

6. In a coupling head for fluid pressure conduits, a closure valve, means for yieldingly closing the same, and a movable stop for holding said closure valve open, in combination with pressure actuated means arranged transversely of the fluid channel for holding said stop in engagement with the valve, and a spring acting in opposition to said pressure actuated means to release the stop when the pressure has descended to a predetermined extent.

7. In a coupling head for fluid-pressure conduits, a closure valve, means for yieldingly closing the same, and a movable stop for holding said closure valve open, in combination with pressure actuated means arranged within the fluid channel for holding said stop in engagement with the valve, and a lever mounted on the coupling head and connected with said pressure actuated means and adapted to be pressed against the pressure actuated means to release the stop.

8. In a coupling head for fluid-pressure conduits, a closure valve, means for yieldingly closing the same, and a movable stop for holding said closure valve open, in combination with pressure actuated means arranged within the fluid channel for holding said stop in engagement with the valve, a spring tending to release the stop when the pressure has descended to a certain extent, and a lever mounted on the coupling head, connected with said pressure actuated means, and adapted to be pressed against the pressure actuated means to release the stop.

In testimony whereof I hereunto affix my signature in the presence of two witnesses.

PETER FURTNER.

Witnesses:
    GEORG SCHMID,
    ABRAHAM SCHLESINGER.